(12) United States Patent
Borovicka et al.

(10) Patent No.: US 10,238,236 B2
(45) Date of Patent: Mar. 26, 2019

(54) PIZZA OVEN CONVERSION APPARATUS FOR KETTLE BARBECUE

(71) Applicant: Charcoal Companion Incorporated, Berkeley, CA (US)

(72) Inventors: Cory Thomas Borovicka, Oakland, CA (US); Kwame Phillips-Solomon, Emeryville, CA (US)

(73) Assignee: Charcoal Companion Incorporated, Berkeley, CA (US)

( * ) Notice: Subject to any disclaimer, the term of this patent is extended or adjusted under 35 U.S.C. 154(b) by 411 days.

(21) Appl. No.: 15/217,928

(22) Filed: Jul. 22, 2016

(65) Prior Publication Data

US 2017/0020337 A1 Jan. 26, 2017

Related U.S. Application Data

(60) Provisional application No. 62/196,830, filed on Jul. 24, 2015.

(51) Int. Cl.
*A47J 37/07* (2006.01)
*A47J 37/04* (2006.01)
*A47J 37/06* (2006.01)

(52) U.S. Cl.
CPC ............ *A47J 37/0786* (2013.01); *A47J 37/04* (2013.01); *A47J 37/06* (2013.01)

(58) Field of Classification Search
CPC ........... A45J 37/07; A47J 37/04; A47J 37/067
USPC .................... 126/25 R, 25 B, 41 R
See application file for complete search history.

(56) References Cited

U.S. PATENT DOCUMENTS

| | | | |
|---|---|---|---|
| 3,299,800 A | | 1/1967 | Angelo |
| 3,697,556 A | * | 10/1972 | Boucourt ............. A61K 31/565 552/619 |
| 4,281,663 A | * | 8/1981 | Pringle ................. A61B 5/024 600/502 |
| 4,467,709 A | | 8/1984 | Anstedt |
| 4,962,696 A | | 10/1990 | Gillis |
| D344,971 S | | 3/1994 | Keller |
| 5,315,922 A | | 5/1994 | Keller |
| 5,768,977 A | | 6/1998 | Parris et al. |

(Continued)

FOREIGN PATENT DOCUMENTS

GB 2465880 A * 6/2010 ............. A47J 37/07

*Primary Examiner* — Gregory Huson
*Assistant Examiner* — Nikhil Mashruwala
(74) *Attorney, Agent, or Firm* — Beeson Skinner Beverly, LLP

(57) ABSTRACT

An apparatus for converting a barbecue into a pizza cooking oven includes an open door frame and vertical side panels pivotally attached to the vertical side posts of the open door frame. The side panels can be pivotally adjusted on the open door frame to extend rearward of the open door frame at different pivot positions. When the side panels are extended rearward of the open door frame, the bottom edges of the side panels provide a support base for setting the apparatus onto the top rim of a bottom bowl of a barbecue and the top edges of the side panels support a cover of a barbecue in an elevated position above the bottom bowl of the barbecue. The elevation of the cover creates an expanded cooking chamber above the bottom bowl of the barbecue and the open door frame provides access to the expanded cooking chamber.

14 Claims, 6 Drawing Sheets

(56) References Cited

U.S. PATENT DOCUMENTS

| | | | | |
|---|---|---|---|---|
| 5,832,915 | A * | 11/1998 | Skidmore | A47J 37/0763 126/9 R |
| 5,836,298 | A * | 11/1998 | Grady | A47J 37/0704 126/506 |
| 5,850,780 | A | 12/1998 | Mascia et al. | |
| 5,960,788 | A * | 10/1999 | Bach | A47J 37/0763 126/276 |
| 6,187,359 | B1 * | 2/2001 | Zuccarini | A47J 37/01 126/25 R |
| 7,383,836 | B2 * | 6/2008 | Klemming | F24B 1/181 126/190 |
| D577,947 | S | 10/2008 | Wimmer | |
| 7,533,605 | B1 * | 5/2009 | Morgan | F24C 15/36 126/24 |
| 9,182,129 | B2 * | 11/2015 | Dahle | F24C 15/16 |
| 9,289,097 | B2 | 3/2016 | Contarino, Jr. | |
| 9,668,615 | B2 * | 6/2017 | Contarino, Jr. | A47J 37/07 |
| 2004/0020484 | A1 * | 2/2004 | Skidmore | A47J 37/0763 126/25 R |
| 2004/0031478 | A1 * | 2/2004 | Gifford | A47J 37/0694 126/25 AA |
| 2009/0199839 | A1 * | 8/2009 | Hulsey | A47J 37/07 126/25 A |
| 2011/0214662 | A1 * | 9/2011 | Contarino, Jr. | A47J 37/07 126/25 R |
| 2014/0026881 | A1 * | 1/2014 | Abrams | A47J 37/0713 126/25 R |
| 2014/0130788 | A1 | 5/2014 | Contarino, Jr. | |
| 2014/0196609 | A1 * | 7/2014 | Snyman | A47J 37/043 99/340 |
| 2016/0227965 | A1 * | 8/2016 | Johnston | A47J 37/0763 |

\* cited by examiner

PIZZA OVEN CONVERSION APPARATUS FOR KETTLE BARBECUE

CROSS-REFERENCE TO RELATED APPLICATIONS

This application claims the benefit of U.S. Provisional Application No. 62/196,830 filed Jul. 24, 2015.

BACKGROUND

This invention relates to barbecue accessories and more particularly to barbecue accessories that can be used in connection with baking pizzas on a barbecue.

Pizzas are an increasingly popular food item and to fulfill the consumer's desire to make pizzas at home, specialized barbecue products have been designed to allow consumers to make pizzas at home. Such products include dedicated portable pizza ovens and conversion kits that convert a backyard barbecue grill into a pizza oven as disclosed in U.S. Patent Application Publication No. U.S. 2011/0214662 by Alfred Contarino, Jr. Contarino discloses an insert for a kettle style barbecue grill which is set on top of the bottom bowl of the barbecue grill for creating a baking chamber, which is accessible through a side opening between the barbecue grill bowl and the grill cover.

A drawback of such inserts is that, whereas kettle-style barbecue grills come in different standard diameters, each insert has a fixed diameter so that it can be used with only one size barbecue grill. Another drawback concerns the volume of the baking chamber above the surface on which the pizza is placed. The insert adds considerable volume to the baking chamber because it must be of a sufficient height to create a large enough access opening to comfortably insert a pizza. The added volume makes it more difficult to bring the temperature up in the baking chamber sufficiently to bake the pizza evenly on both sides. Compounding the problem is the heat that is lost through the access opening in the insert.

The present invention provides a pizza oven conversion apparatus that can be used with different sized barbecue grills, that decreases the volume added to the baking chamber, and that helps correct for the imbalance of heat in the baking chamber created by the access opening in the insert.

DETAILED DESCRIPTION OF ILLUSTRATED EMBODIMENT

Figures 1, 2A:
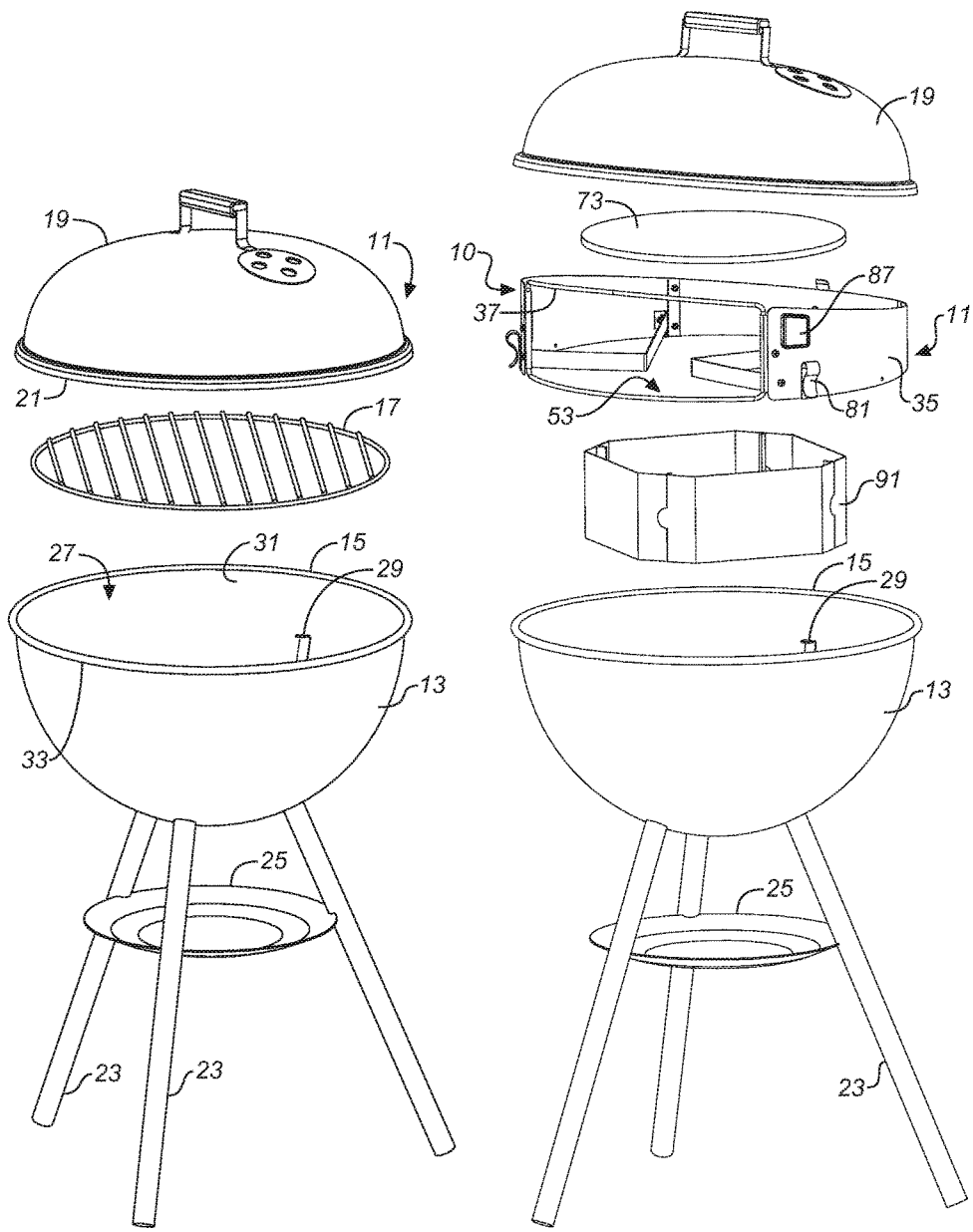
FIG. 1. is an exploded perspective view of a kettle-style barbecue without a conversion apparatus.
FIG. 2A is an exploded perspective view of a kettle-style barbecue with a conversion apparatus in accordance with the invention.

Referring now to the drawings, FIG. 1 shows a conventional kettle-style barbecue 11 comprised of a bottom bowl 13 with a top rim 15, a grill rack 17, and a dome shaped cover 19. The dome cover has a bottom rim 21 sized in correspondence with the top rim of the heat source bowl. The bottom bowl, which houses a heat source such as gas burners (not shown), or which is filled with an ignitable heat source such as charcoal briquettes, is supported at a convenient working elevation by legs 23. A removable ash dish 25 is typically provided to catch ash released through ash release openings (not shown) in the bottom of the bowl. The ash dish is held between the bowl's support legs by spring clips (also not shown). The grill rack 15 is set into the top opening 27 of the bowl and supported near the top opening by support tabs 29 projecting inwardly from the bowl's inside wall 31. When food items are placed on the grill rack above an active heat source, the cover 19 is placed over the heat source bowl to create an enclosed, high temperature cooking chamber for the food items.

The bottom rim 21 of the barbecue's cover 19 is shown as having an outwardly stepped engagement edge, which engages and seats on the top rim 15 of the heat source bowl 13. The top rim of the bowl is seen to have a somewhat enlarged beaded edge 33 for eliminating shape edges and providing a more robust edge structure for supporting the cover.

To convert the barbecue 11 into an oven for efficiently cooking pizzas, access to the enclosure cooking chamber of the barbecue must be provided to allow pizzas to be slid onto a proper cooking surface in the cooking chamber such as by using a pizza peel, to then be watched for doneness, and finally when done to be slid back out of the cooking chamber. Such access is provided by a conversion apparatus in accordance with the invention, an embodiment of which is now described in reference to FIGS. 2A-C, and which is denoted in the drawings by the numeral 10.

Figure 4:
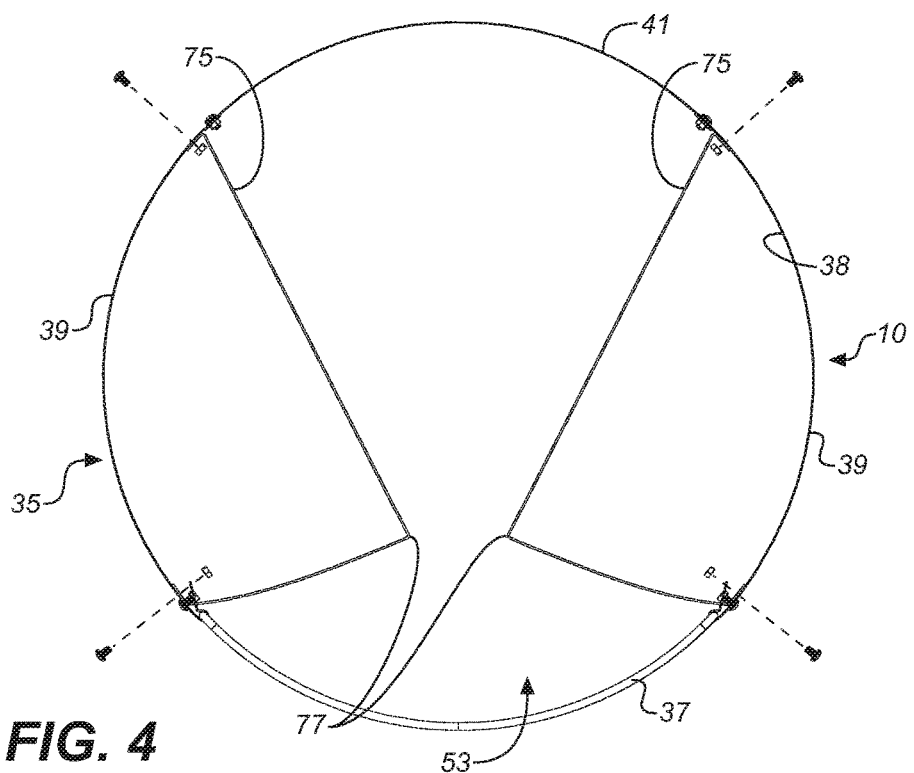
FIG. 4 is a top plan view of the conversion apparatus shown in FIG. 3 in an assembled condition.
Figure 5:
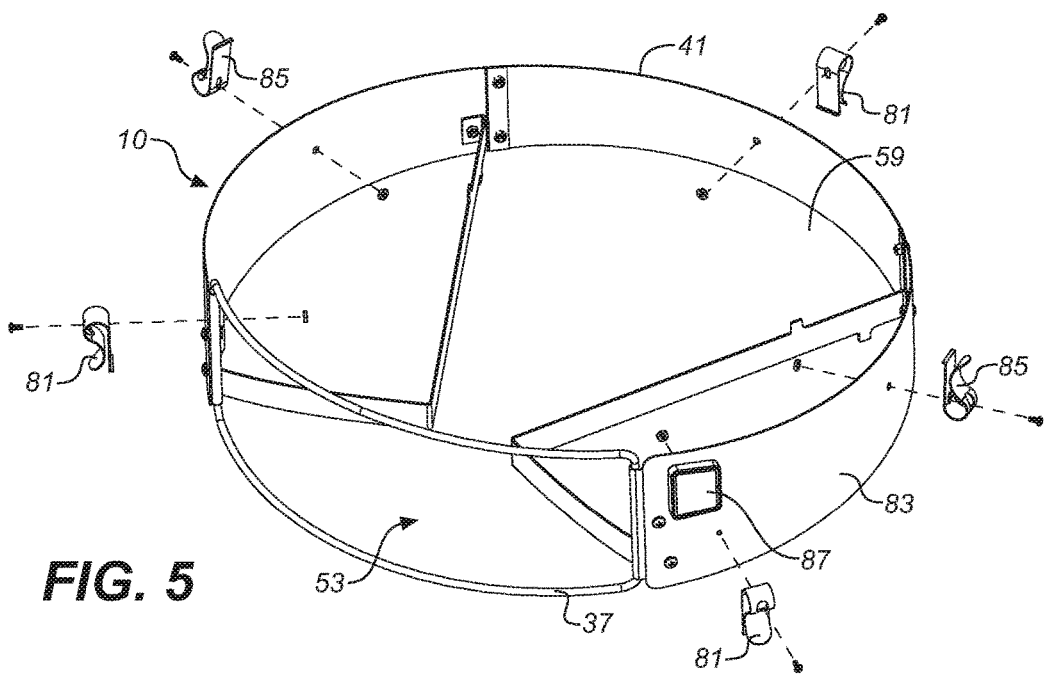
FIG. 5 is a top perspective view thereof with retainer clips exploded away from the insert shell of the apparatus.
Figure 6:
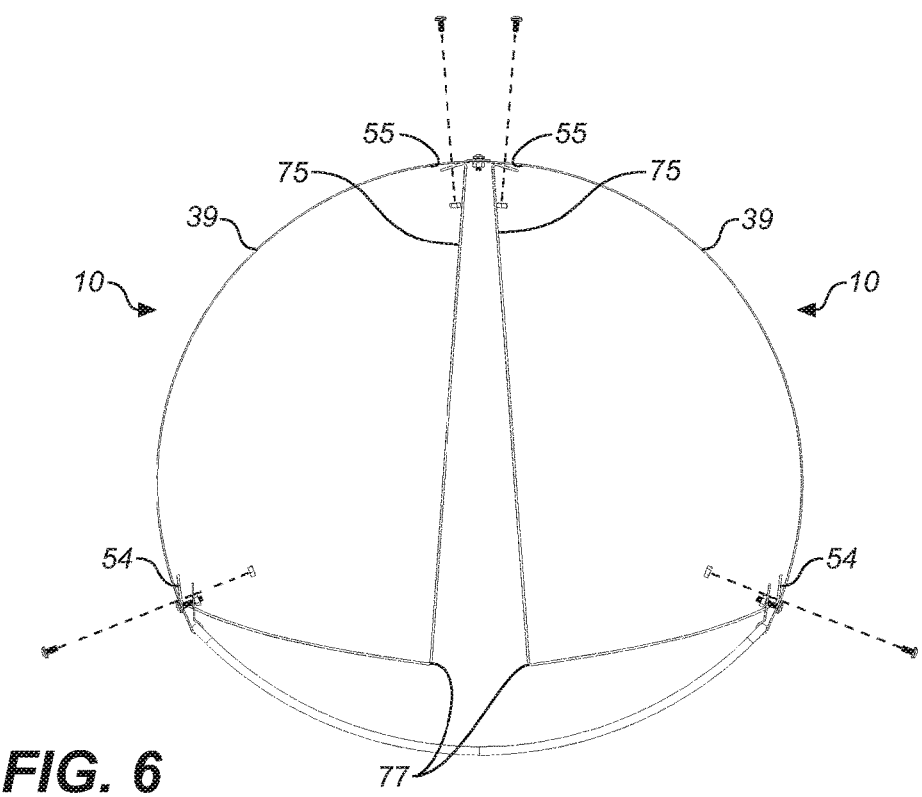
FIG. 6 is a top perspective view thereof with the rear insert panel of the insert shell removed to reduce the size of the shell for use on a smaller barbecue.
Figure 7:
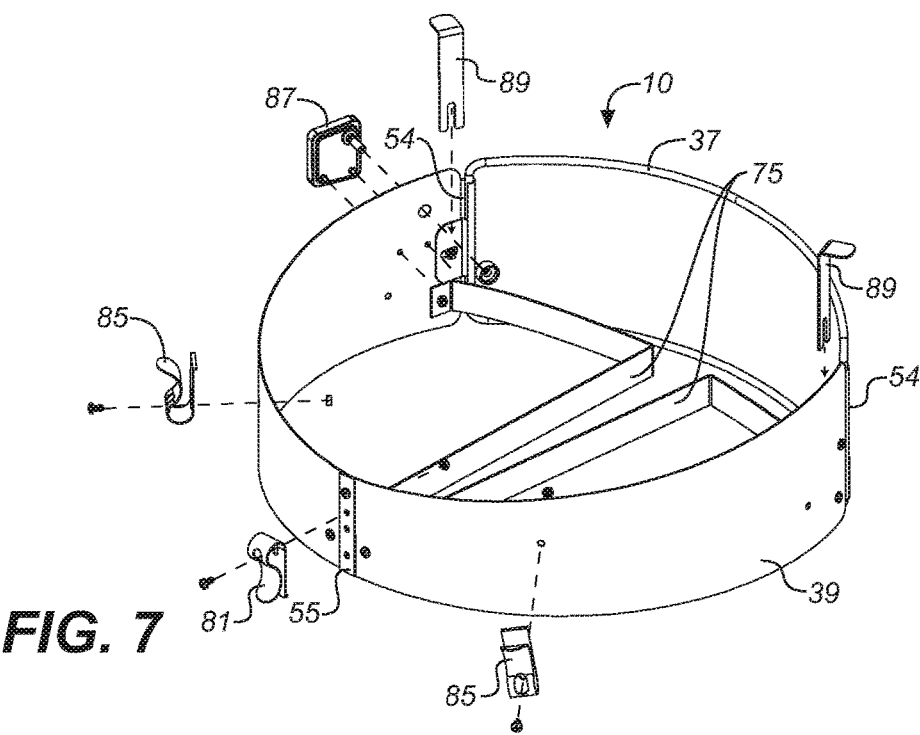
FIG. 7 is a top perspective view thereof with retainer clips exploded away from the insert shell of the apparatus.

The conversion apparatus includes a generally cylindrical outer shell 35 comprised of an open door frame 37, vertical side panels 39, and an optional rear insert panel 41. The open door frame 37, which is most suitably a wire frame, has a generally rectangular shape and is seen to include straight vertical side posts 43, a horizontally extending top frame element 45 which extends between the tops 47 of the side posts, and a horizontally extending bottom frame element 49 which extends between the bottoms 51 of the side posts. The side posts and horizontally extending frame elements form an access opening 53 for the conversion apparatus which extends in the horizontal direction. The vertical side panels, which extend rearward of the open door frame, are pivotally attached at their front edges 54 to the vertical side posts of the frame to allow for adjustments in the diameter of the outer shell. The trailing edges 55 of the side panels can be brought together and attached as shown in FIGS. 6 and 7 or the optional rear insert panel 41 could be used as shown in FIGS. 4 and 5 to accommodate a larger diameter barbecue grill. The rear insert panel is attached to the trailing edges 55 of side panels 39, which are rotated outwardly on the vertical side posts 43 of open door frame 37 to receive the rear insert. Rear insert panels could be provided in different predetermined lengths to allow the conversion apparatus to be used with more than two different barbecue grill sizes. It is also understood that two or more inserts capable of being connected together could be provided wherein different numbers of inserts can be used to accommodate different sized barbecue grills.

Figures 2B, 2C:
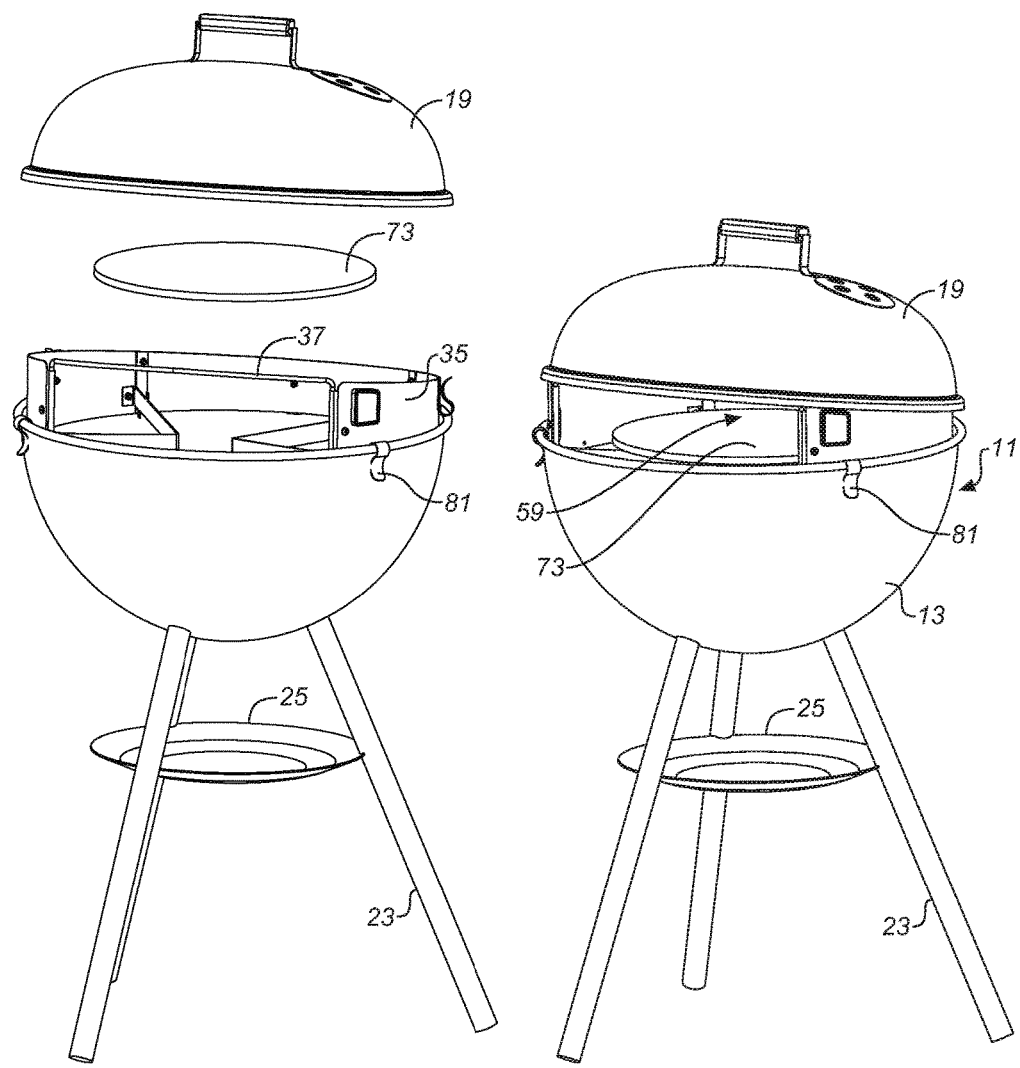
FIG. 2B is a perspective view of a kettle-style barbecue with a conversion apparatus in accordance with the invention installed and showing the pizza stone and top cover exploded away from the bottom bowl of the barbecue.
FIG. 2C is a perspective view of a kettle-style barbecue with a conversion apparatus in accordance with the invention installed and showing the pizza stone and top cover in place.

As best shown in FIG. 2C, when the conversion apparatus is installed, the assembled outer shell creates an extended baking chamber 59 in the converted barbecue behind the shell's open door frame 37. A pizza is placed in this extended baking chamber through the horizontally extending access opening created by the open door frame. As described below, the baking chamber does not have a uniform height but rather tapers down to a lower height at the back of the chamber opposite the access opening 53 in the shell where heat loss occurs. This tapering of the baking chamber extension reduces air volume and allows heat to be better concentrated at the back of the chamber away from the access opening.

The taper of the baking chamber can be achieved by the construction of the shell's vertical side panels 39, each of which is seen to have a top edge 61 and a bottom edge 63. When the side panels are extended rearward of the open door frame and connected in their closed position (with or without the rear insert), the bottom edges of the panels will lie in a horizontal plane to provide a base edge by which the conversion apparatus can be supported at the top rim 15 of the grill's bottom bowl 13. The top edges of the side panels, however, will not lie in the horizontal plane of the bottom edges, but will taper from a maximum height at their front edges 54 down to a minimum height at their trailing edges 55. These inclined top edges provide the outer shell with an inclined top support rim. This shell support rim supports the top dome cover 19 of the barbecue grill in an elevated position above the grill of the barbecue grill, but at an inclined angle as shown in FIG. 2C. The rear insert panel 41 similarly has a top and bottom edge defining the height of this panel. The bottom edge 65 lies in a horizontal plane while the top edge 67 does not. Rather, the top edge has a gentle curve that continues the taper of the side panels when inserted in the shell. The top and bottom edges of the insert extend to the panels' end edges 69, which have a height corresponding to the height of the side panel's trailing edges 55.

To provide a means for supporting a pizza stone, such as pizza stone 73 shown in FIGS. 2A and 2C, the outer shell 35 of the conversion apparatus 10 contains at least one elongated support member which extends internally of the shell and which has sufficient rigidity to support the weight of a pizza stone. In the illustrated embodiment, there are two bent, preferably flat bar support members 75, one attached to the inside wall 38 of each of the shell's vertical side panels 39, such that the flat direction of the flat bars is in the direction of the vertical direction of the side panels. The bend 77 of the support members provides a flex point which advantageously allows the side panels to be rotated inwardly and outwardly of the open door frame 37, and the orientation of the flat bar support members provides ample rigidity to the supports for holding the weight of a pizza stone.

It is noted that, by providing internal support means for the pizza stone in the shell of the conversion apparatus, the grill rack can be entirely removed from the barbecue grill before the conversion apparatus is placed on the bowl of the grill. Also, the elevation of the pizza stone relative to the access opening through which the pizza is inserted will greatly facilitate the insertion and removal of the pizza from the converted grill.

It is seen that the conversion apparatus can be supported on the bottom bowl of the barbecue grill by means of downwardly pointing retainer clips 81 attached to the outside wall 83 of the outer shell 35. These clips clip onto the top rim of the bowl when the conversion apparatus is installed. Reversed upwardly pointing clips 85 can also be attached to the outside wall of the outer shell for receiving and holding the grill dome cover in place. The diameter of the outer shell would be sized to allow engagement of the bowl and cover by these clips. In addition to these clips, a temperature gauge 87 can be secured in one of the side panels of the shell for monitoring the temperature in the baking chamber 59 above the pizza. Front support tabs 89 can also be provided on the top support rim of the shell for additional support for the grill's dome cover. Generally these supports would only be used with larger grills such as those having an 18.5 inch diameter.

The parts of the grill are all suitably heat resistant metal, with the outer shell being inexpensively fabricated sheet metal parts and a bent wire frame.

Figure 3:
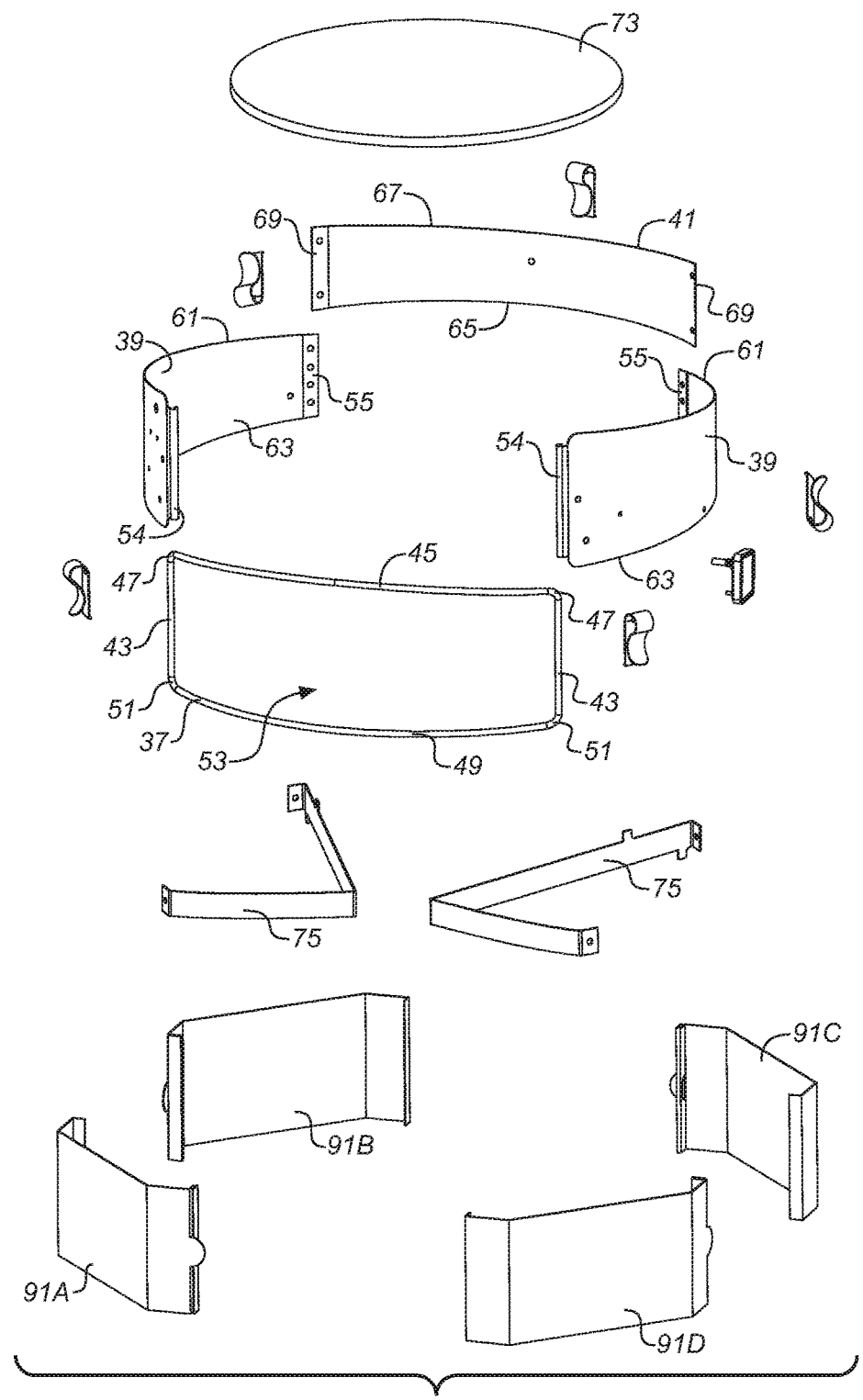
FIG. 3 is an exploded perspective view of a conversion apparatus shown in the foregoing figures.
Figure 8:
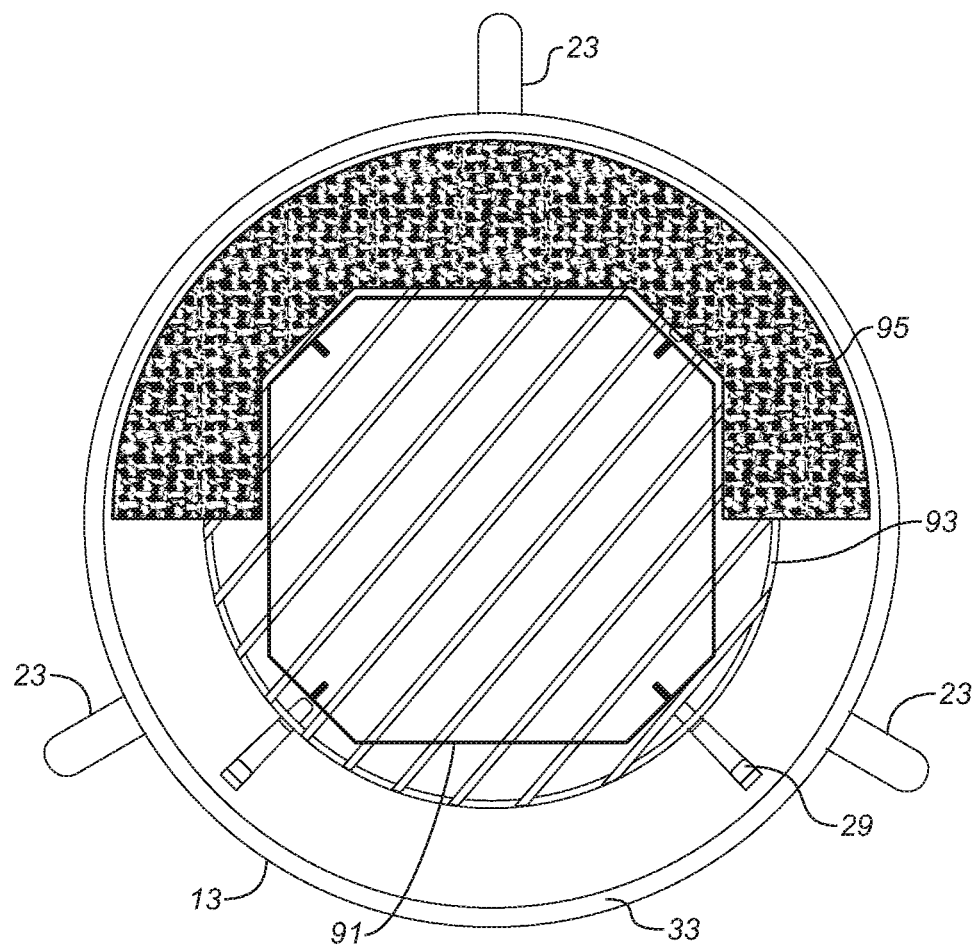
FIG. 8 is a top plan view of the bottom bowl of a kettle-style barbecue showing a charcoal dam which allows charcoal to be concentrated on one side of the barbecue to concentrate heat in a desired manner for baking a pizza using the conversion apparatus in accordance with the invention.

FIG. 8 illustrates how the charcoal dam 91 shown in FIGS. 2A and 3 is used to concentrate the charcoal at the back of the grill bowl 13. Shown is a generally square dam assembled from four side pieces 91A, 91B, 91C, 91D as seen in FIG. 3. When the dam is placed on the briquette holding rack 93, the charcoal briquettes 95 are piled up behind the dam where they will produce heat concentrated at the back of the bowl beneath the narrow height end of the outer shell of the conversion apparatus. This heat will thus be directed to the side of the baking chamber opposite the shell's open door frame, providing better heat management within the baking chamber.

While the illustrated embodiment of the invention has been described in considerable detail in the foregoing specification, it is not intended that the invention be limited to such detail, excepted as may be necessitated by the claims of the application.

What we claim is:

1. A conversion apparatus for converting a barbecue into a pizza cooking oven, wherein the barbecue includes a bottom bowl for a heat source and a removable cover for covering the bottom bowl to create a cooking chamber above the heat source, and wherein the bottom bowl has a top rim having a top rim configuration, the conversion apparatus comprising:

a door frame formed by side posts and top and bottom frame elements extending between the side posts, the side posts and top and bottom frame elements of the door frame defining an opening through which a pizza or other food item is inserted, vertical side panels pivotally attached at a front edge to the side posts of the door frame, wherein the side panels are adjustable to different pivot positions on the door frame, the side panels having a top edge and a bottom edge, wherein, when the side panels are pivotally adjusted to extend rearwardly of the open door frame to a pivot position in correspondence with the top rim configuration of the bottom bowl of the barbecue, the bottom edges of the side panels provide a support base for supporting the conversion apparatus at the top rim of the bottom bowl of the barbecue and the top edges of the side panels provide a top support rim for supporting the cover of the barbecue in an elevated position above the bottom bowl of the barbecue, and wherein the elevated cover of the barbecue creates an expanded cooking chamber above the heat source of the barbecue, and further wherein the door frame to which the side panels are attached provides access to the expanded cooking chamber.

2. The conversion apparatus of claim 1 wherein the side panels of the conversion apparatus have a shape that approximately follows the shape of the rims of the cover and bowl of the barbecue.

3. The conversion apparatus of claim 1 wherein the side panels have a pivot position where the rear edges of the panels engage to for ring enclosure.

4. The conversion apparatus of claim 1 further comprising at least one rear insert panel, wherein the side panels have a pivot position where the rear edges of the side panels are separated by a gap and the rear insert panel is attachable to the rear edges of the side panels to form a ring enclosure.

5. The conversion apparatus of claim 1 further comprising at least one rear insert panel, wherein the side panels have a first pivot position where the rear edges of the panels engage to form a ring enclosure of a first size and a second pivot position where the rear edges of the panels are separated by a gap, and wherein the rear insert panel is attachable to the rear edges of the side panels to form an extended ring enclosure of a second size when the side panels are pivoted to their second pivot position.

6. The conversion apparatus of claim 1 wherein the side panels have a front edge for attaching to the side posts of the door frame and a rear edge, and wherein the top edges of the side panels taper from a maximum height at the front edge of the panels to a minimum height at the rear edge of the panels, and further wherein the top edges of the side panels support the cover of the barbecue at an inclined angle above the bottom bowl of the barbecue.

7. The conversion apparatus of claim 1 wherein the bottom edges of the side panels lay in a horizontal plane and the top edges of the side panels each taper from a maximum height at their front edge to a minimum height at their rear edge.

8. The conversion apparatus of claim 1 wherein the side panels have an inside wall and wherein a support member is attached to the inside wall of each of the side panels, the support members being configured to support a cooking plate when the conversion apparatus is supported in an operative position on the bottom bowl of the barbecue.

9. The conversion apparatus of claim 1 further comprising one or more downward pointing retainer clips detachably secured to the side panels for securing the conversion apparatus to the bottom bowl of the barbeque.

10. The conversion apparatus of claim 9 further comprising one or more upwardly pointing retainer clips detachably secured to the side panels for securing the conversion apparatus to the cover of the barbeque.

11. The conversion apparatus of claim 1 wherein the door frame and the side panels are made of a heat resistant metal, with the side panels being made of fabricated sheet metal parts and the door frame being fabricated of a bent wire frame.

12. A conversion apparatus for converting a barbecue into a pizza cooking oven, wherein the barbecue includes a bottom bowl for a heat source and a removable cover for covering the bottom bowl to create a cooking chamber above the heat source, and wherein the bottom bowl has a top rim having a top rim configuration, the conversion apparatus comprising:

a bent wire door frame defining an opening through which a pizza or other food item is inserted, a portion of the bent wire door frame forming side posts, vertical side panels pivotally attached to the side posts of the door frame, wherein the side panels are adjustable to different pivot positions on the side posts of the bent wire door frame, the side panels having a top edge, a bottom edge, a front edge and a rear edge opposite the front edge, wherein, when the side panels are extended rearward of the door frame, the bottom edges of the side panels provide a support base for supporting the conversion apparatus at the top rim of the bottom bowl of the barbecue and the top edges of the side panels provide a top support rim for supporting the cover of the barbecue in an elevated position above the bottom bowl of the barbecue, and wherein the elevated cover of the barbecue creates an expanded cooking chamber above the heat source of the barbecue, and further wherein the door frame to which the side panels are attached provides access to the expanded cooking chamber, and a support member attached to the inside wall of each of the side panels', the support members having a bend that allows the support members to flex when the vertical side panels pivot on the side posts of the bent wire door frame, the support members being configured to support a cooking plate when the conversion apparatus is supported in an operative position on the bottom bowl of the barbecue.

13. A conversion apparatus for converting a barbecue into a pizza cooking oven, wherein the barbecue includes a bottom bowl far a heat source and a removable cover for covering the bottom bowl to create a cooking chamber above the heat source, and wherein the bottom bowl has a top rim having a top rim configuration, the conversion apparatus comprising:

a door frame formed by vertical side posts, a horizontally extending top frame element, and a horizontally extending bottom frame element, the side posts and horizontally extending frame elements of the door frame defining an opening through which a pizza or other food item is inserted, vertical side panels having a top edge, a bottom edge, a front edge and a rear edge opposite the front edge, the vertical side panels being pivotally attached at their front edges to the vertical side posts of the door frame, wherein the side panels are adjustable to different pivot positions on the vertical side posts of the door frame, wherein, when the side panels are pivotally adjusted to extend rearwardly of the door frame to a position in correspondence with the top rim configuration of the bottom bowl of the barbecue, the bottom edges of the side panels provide a support base for supporting the conversion apparatus at the top rim of the bottom bowl of a barbecue and the top edges of the side panels provide a top support rim for supporting a cover of a barbecue in an elevated position above the bottom bowl of the barbecue, and wherein the elevated cover of the barbecue creates an expanded cooking chamber above the heat source of the barbecue, and further wherein the door frame to which the side panels are attached provides access to the expanded cooking chamber, a rear insert panel, one or more downward pointing retainer clips detachably securable to the side panels for securing the conversion apparatus to the bottom bowl of the barbeque, one or more upwardly pointing retainer clips detachably securable to the side panels for securing the conversion apparatus to the cover of the barbeque, wherein the side panels can be pivoted between a first position where the, rear edges of the panels engage to form a ring enclosure of a first size and a second position where the rear edges of the panels are separated by a gap, and wherein the rear insert panel is attachable to the rear edges of the side panels to form an extended ring enclosure of a second size when the side panels are pivoted to their second position, wherein the bottom edges of the side panels lay in a horizontal plane and the top edges of the side panels each taper from a maximum height at their front edge to a minimum height at their rear edge, wherein the top edges of the side panels provide a top support rim for supporting the cover of the barbecue at an inclined angle above the grill of the barbecue, and wherein the rear insert panel has a top and bottom edge defining the height of the rear insert panel, the bottom edge laying in a horizontal plane and the top edge being curved so as to continue the taper of the top edges of the side panels.

14. The conversion apparatus of claim 13 wherein the door frame and the side panels are made of a heat resistant metal, with the side panels being made of fabricated sheet metal parts and the door frame being fabricated of a bent wire frame.

* * * * *